(12) United States Patent
Stopford et al.

(10) Patent No.: US 12,130,394 B2
(45) Date of Patent: Oct. 29, 2024

(54) FIBER OPTIC INTERROGATION SYSTEM

(71) Applicant: Schlumberger Technology Corporation, Sugar Land, TX (US)

(72) Inventors: Paul Stopford, Clamart (FR); Surya Simanjuntak, Clamart (FR); Dmitry Kortukov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 420 days.

(21) Appl. No.: 17/754,406

(22) PCT Filed: Oct. 2, 2020

(86) PCT No.: PCT/US2020/053894
§ 371 (c)(1),
(2) Date: Mar. 31, 2022

(87) PCT Pub. No.: WO2021/067662
PCT Pub. Date: Apr. 8, 2021

(65) Prior Publication Data
US 2022/0334279 A1   Oct. 20, 2022

Related U.S. Application Data

(60) Provisional application No. 62/910,194, filed on Oct. 3, 2019.

(51) Int. Cl.
*G01V 1/22* (2006.01)
*E21B 47/135* (2012.01)
*G02B 6/42* (2006.01)

(52) U.S. Cl.
CPC ............ *G01V 1/226* (2013.01); *E21B 47/135* (2020.05); *G02B 6/4215* (2013.01)

(58) Field of Classification Search
CPC .. G01V 1/226; E21B 47/135; G01N 29/2418; G01N 2291/02827; G01N 2291/02881; G02B 6/4215
See application file for complete search history.

(56) References Cited

U.S. PATENT DOCUMENTS

| | | |
|---|---|---|
| 6,154,594 A | 11/2000 | Fiacco et al. |
| 6,278,816 B1 | 8/2001 | Keur et al. |

(Continued)

FOREIGN PATENT DOCUMENTS

| | | |
|---|---|---|
| EP | 1939596 A1 | 7/2008 |
| WO | 2011010110 A2 | 1/2011 |

(Continued)

OTHER PUBLICATIONS

X. Sun, J. Li, T. David, M. H. Burgess and B. Zhu, (2014) A multicore optical fiber for distributed sensing, SPIE Sensing Technology + Applications, 2014, Baltimore, Maryland, US (5 pages).

(Continued)

*Primary Examiner* — Francis C Gray
(74) *Attorney, Agent, or Firm* — Jeffrey D. Frantz

(57) ABSTRACT

A sensing optical fiber includes multiple waveguides or cores to allow sensing of multiple measurands using a single fiber. The fiber can be a dual clad fiber having a single mode core and a multi-mode core disposed radially or circumferentially about the single mode core. A dual clad fiber coupler couples source light from a DAS interrogator and a DTS interrogator into the dual clad fiber in use.

15 Claims, 15 Drawing Sheets

(56) References Cited

U.S. PATENT DOCUMENTS

| | | | |
|---|---|---|---|
| 6,411,762 B1 | 6/2002 | Anthon et al. | |
| 6,536,240 B1 | 3/2003 | Gouskov et al. | |
| 6,769,275 B2 | 8/2004 | Guskov et al. | |
| 6,973,246 B2 | 12/2005 | Bocanegra et al. | |
| 7,272,287 B2 | 9/2007 | Bise et al. | |
| 7,340,138 B1 | 3/2008 | Yablon | |
| 7,379,631 B2 | 5/2008 | Poland et al. | |
| 7,428,924 B2* | 9/2008 | Patel | E21B 43/12 166/205 |
| 7,503,395 B2 | 3/2009 | Meijer et al. | |
| 7,512,292 B2 | 3/2009 | MacDougall et al. | |
| 7,640,977 B2 | 1/2010 | Jonas | |
| 7,793,612 B2 | 9/2010 | Guskov et al. | |
| 7,798,212 B2 | 9/2010 | Bolze et al. | |
| 7,916,386 B2 | 3/2011 | DiGiovanni et al. | |
| 8,123,400 B2 | 2/2012 | Andrejco et al. | |
| 8,503,847 B2 | 8/2013 | Kokubun et al. | |
| 8,520,197 B2 | 8/2013 | Handerek | |
| 8,737,792 B2 | 5/2014 | Fini et al. | |
| 8,760,639 B2 | 6/2014 | Handerek | |
| 8,971,685 B2 | 3/2015 | Matsuo et al. | |
| 9,007,681 B2 | 4/2015 | Zhu | |
| 9,164,234 B2 | 10/2015 | Feder et al. | |
| 9,314,977 B2 | 4/2016 | Peeters | |
| 9,586,852 B2 | 3/2017 | Ishida et al. | |
| 9,841,556 B2 | 12/2017 | Butler et al. | |
| 9,946,014 B2 | 4/2018 | Abedin et al. | |
| 10,016,948 B2 | 7/2018 | Peeters et al. | |
| 10,018,558 B2 | 7/2018 | Yaman et al. | |
| 10,031,285 B2 | 7/2018 | Nakanishi et al. | |
| 10,173,381 B2 | 1/2019 | Xia et al. | |
| 2005/0279510 A1* | 12/2005 | Patel | E21B 33/12 166/380 |
| 2014/0285793 A1 | 9/2014 | Jaaskelainen et al. | |
| 2014/0285795 A1 | 9/2014 | Jaaskelainen et al. | |
| 2016/0147011 A1 | 5/2016 | Hankey et al. | |
| 2017/0205574 A1 | 7/2017 | Emslie et al. | |
| 2017/0260846 A1* | 9/2017 | Jin | E21B 47/113 |
| 2018/0058982 A1* | 3/2018 | Hartog | G01H 9/004 |
| 2019/0063960 A1 | 2/2019 | Ramos | |
| 2019/0063962 A1 | 2/2019 | Emslie et al. | |
| 2019/0212761 A1 | 7/2019 | Swanson et al. | |
| 2020/0032644 A1* | 1/2020 | Xia | G01D 5/35358 |
| 2020/0319358 A1* | 10/2020 | Jaaskelainen | E21B 47/135 |
| 2021/0372213 A1* | 12/2021 | Park | G02B 6/50 |

FOREIGN PATENT DOCUMENTS

| | | |
|---|---|---|
| WO | 2017203271 A1 | 11/2017 |
| WO | 2018060702 A1 | 4/2018 |
| WO | 2018093368 A1 | 5/2018 |

OTHER PUBLICATIONS

International Search Report and Written Opinion issued in PCT Application PCT/US2020/053894, dated Jan. 11, 2020 (11 pages).
All Silica Double Clad Fiber, See https://www.fibercore.com/product/all-silica-double-clad-fiber, downloaded on Mar. 30, 2022 (4 pages).

* cited by examiner

FIBER OPTIC INTERROGATION SYSTEM

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application claims priority benefit of U.S. Provisional Application No. 62/910, 194, filed Oct. 3, 2019, the entirety of which is incorporated by reference herein and should be considered part of this specification.

BACKGROUND

Field

The present disclosure generally relates to distributed fiber optic monitoring.

Description of the Related Art

Fiber optic sensing systems can be used for distributed temperature, strain, and/or vibration (acoustic) monitoring. Such systems can include interrogators and optical fibers acting as distributed sensors. The interrogators leverage various scattering mechanisms within the optical fiber material. Different types of optical fibers can be particularly well suited for different measurands. For example, multi-mode fiber can be well-suited for temperature measurements, and single-mode fiber can be well-suited for strain and vibration measurements.

For use in oil and gas wells, such sensing optical fibers can be deployed in pre-installed control lines (e.g., metal tubing) via a pumping method. The control lines can loop back to the surface in a U configuration to provide an output for pumping fluids and enable double-ended fiber interrogation. The lines and fibers are typically terminated at the surface, often with pressure barrier componentry. The fibers can be spliced to surface cabling that connects to the interrogators.

SUMMARY

In some configurations, a fiber optic sensing system for use in a wellbore includes a multicore optical fiber; Distributed Acoustic Sensing (DAS) instrumentation comprising an interrogator; Distributed Temperature Sensing (DTS) instrumentation comprising an interrogator; and a coupler or optical switch disposed between the multicore optical fiber and the DAS and DTS instrumentation.

The system can include a wavelength filtering device placed between the coupler and the DAS instrumentation. The wavelength filtering device can be a thin film filter. The multicore optical fiber can have a multi-mode core waveguide concentrically or radially surrounding a single mode core waveguide. The system can have a double ended configuration with a first end of the multicore optical fiber coupled to the coupler or optical switch and a second end of the optical fiber coupled to the DTS instrumentation. The system can include a second coupler or optical switch disposed between the multicore optical fiber and the DTS instrumentation, with a first end of the multicore optical fiber coupled to the coupler or optical switch and a second end of the optical fiber coupled to the second coupler or optical switch. The system can include a plurality of multicore optical fibers and a plurality of couplers or optical switches, each of the plurality of couplers or optical switches associated with one of the plurality of multicore optical fibers. Such a system can include a switch disposed between the DAS instrumentation and the plurality of couplers or optical switches, the switch configured to multiplex the DAS instrumentation.

In some configurations, a method of deploying a multicore optical fiber in a wellbore includes deploying a control line in the wellbore, the control line comprising a metal tube; and pumping the multicore optical fiber into the control line.

The multicore optical fiber can include a multi-mode core waveguide concentrically or radially surrounding a single mode core waveguide. Pumping the multicore optical fiber can include using water, e.g., sea water, Toluene, Xylene, and/or IPA as a carrier medium. The wellbore can be completed with a multi-stage completion having an upper completion and a lower completion, and pumping the multicore optical fiber can allow the multicore optical fiber to reach the lower completion. Deploying the control line can include using a Control Line Wet Mate (CLWM) to couple a first portion of the control line in the upper completion with a second portion of the control line in the lower completion. Pumping the multicore optical fiber can then include deploying continuous optical fiber through the first and second portions of the control line to reach the lower completion. Deploying the control line can include coupling the control line to an outside of production tubing deployed in the wellbore. Deploying the control line can include disposing the control line outside of a casing of the wellbore and cementing the control line in place. Deploying the control line can include disposing the control line within coiled tubing.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The present disclosure generally relates to systems and methods for performing distributed optical fiber measurements, for example, on a dual-clad or multicore optical fiber. Such systems and methods can be used in the oil and gas industry, for example, for reservoir, well, and asset monitoring. Fiber optic sensing systems can be used for distributed temperature, strain, and/or vibration (acoustic) monitoring. Such systems can include interrogators and optical fibers acting as distributed sensors. In use, light is pulsed into the optical fiber. As light passes along the fiber, tiny amounts of the light interact with the structure of the fiber and are scattered back towards the acquisition instrument.

Figure 12:
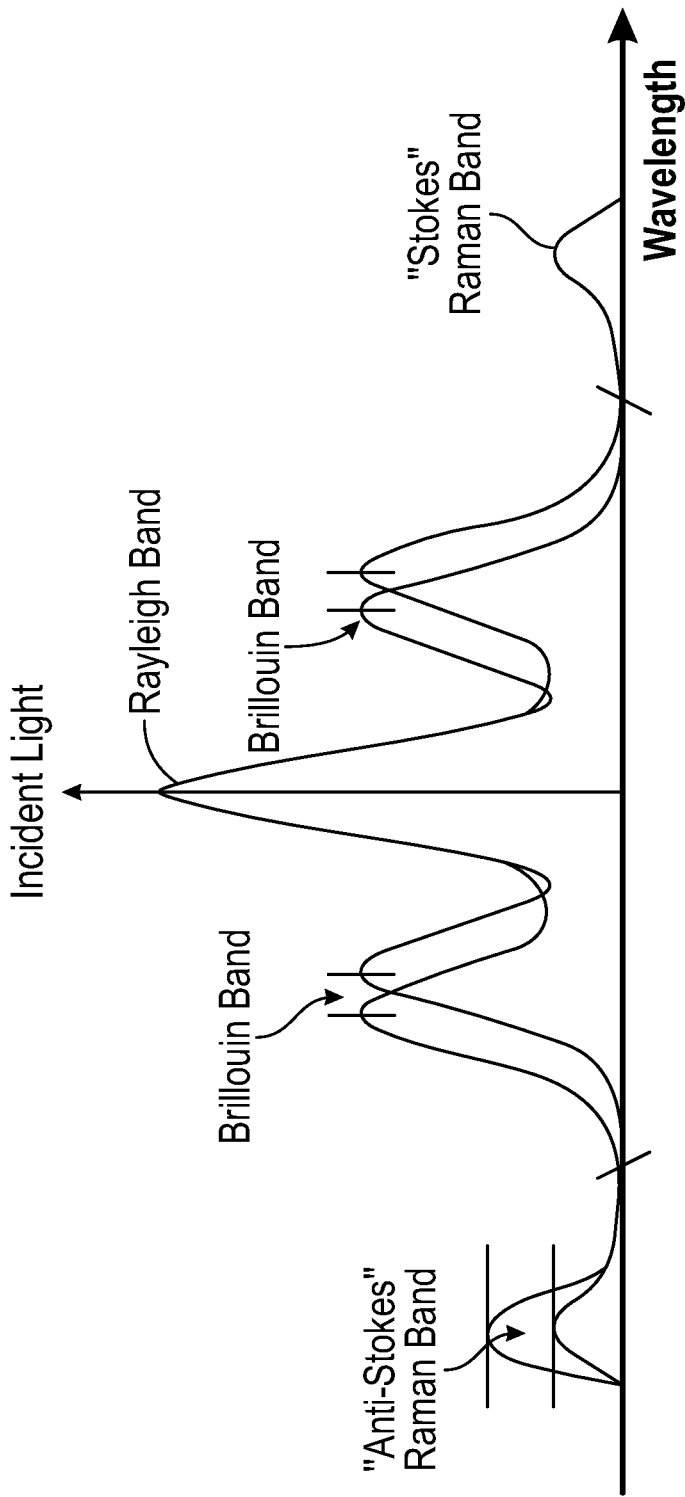
FIG. 12 illustrates an optical spectrum showing pulse or incident light and three scattering bands.

Three primary types of scattering occur. FIG. 12 illustrates an optical spectrum showing the pulse or incident light and the three scattering bands. Rayleigh scattering is the strongest component of the scattered light and at the same wavelength as the pulsed light. Rayleigh scattered light is used for distributed acoustic sensing (DAS). The band of Brillouin scattering is sensitive to temperature and strain. In other words, its wavelength or frequency will shift with temperature and strain. Brillouin scattering can be used for distributed strain sensing (DSS). However, it is difficult to distinguish or separate thermal strain and mechanical strain. Raman scattering is split into two bands, Stokes and Anti-Stokes. The Stokes amplitude is not sensitive to temperature, whereas the Anti-Stokes amplitude is sensitive to temperature. The ratio between Stokes and Anti-Stokes amplitudes is used for distributed temperature sensing (DTS).

Fiber optic sensing system interrogators leverage various scattering mechanisms within the optical fiber material. Different types of optical fibers can be particularly well suited for different measurands. For example, multi-mode fiber can be well-suited for temperature measurements, and single-mode fiber can be well-suited for strain and vibration measurements.

For use in oil and gas wells, such sensing optical fibers can be deployed in pre-installed control lines (e.g., metal tubing) via a pumping method. The fiber is pumped, typically with water (e.g., sea water in some cases), Toluene, Xylene, and/or IPA as a carrier medium, into the pre-installed control lines or metal tubing. The control lines can traverse a length of the well and loop back to the surface in a U configuration to provide an output for pumping fluids and enable double-ended fiber interrogation. Alternatively, the control lines can traverse the length of the well and terminate downhole, such that only one end of the tubing is accessible at the surface. The lines and fibers are typically terminated at the surface, often with pressure barrier componentry. The fibers can be spliced to surface cabling that connects to the interrogators.

Figure 13A:
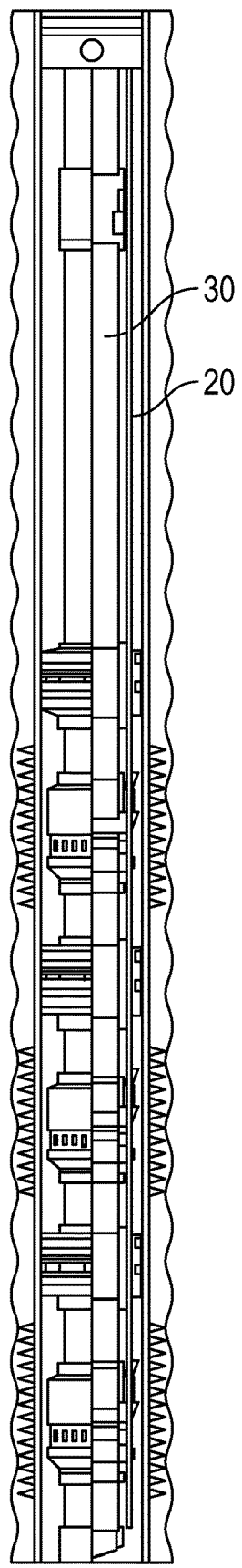
FIG. 13A illustrates an example well completion in which a control line for optical fibers is connected to production tubing.
Figure 13B:
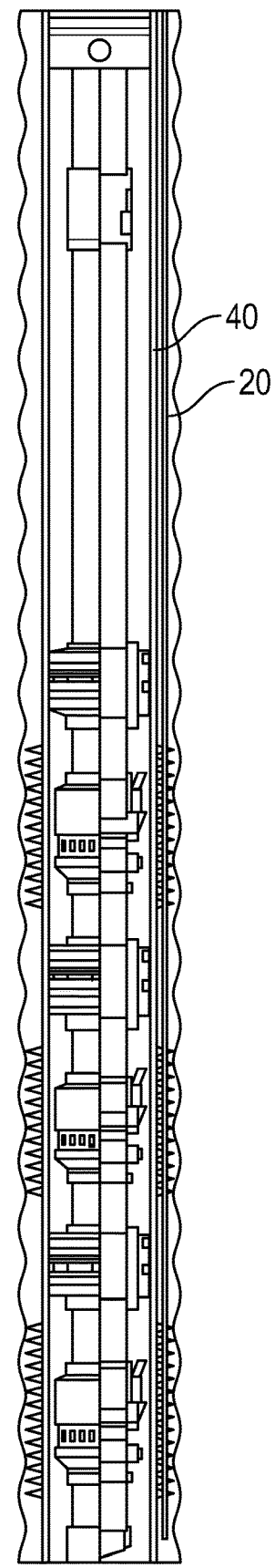
FIG. 13B illustrates an example well completion in which a control line is connected to the outside of a casing.
Figure 13C:
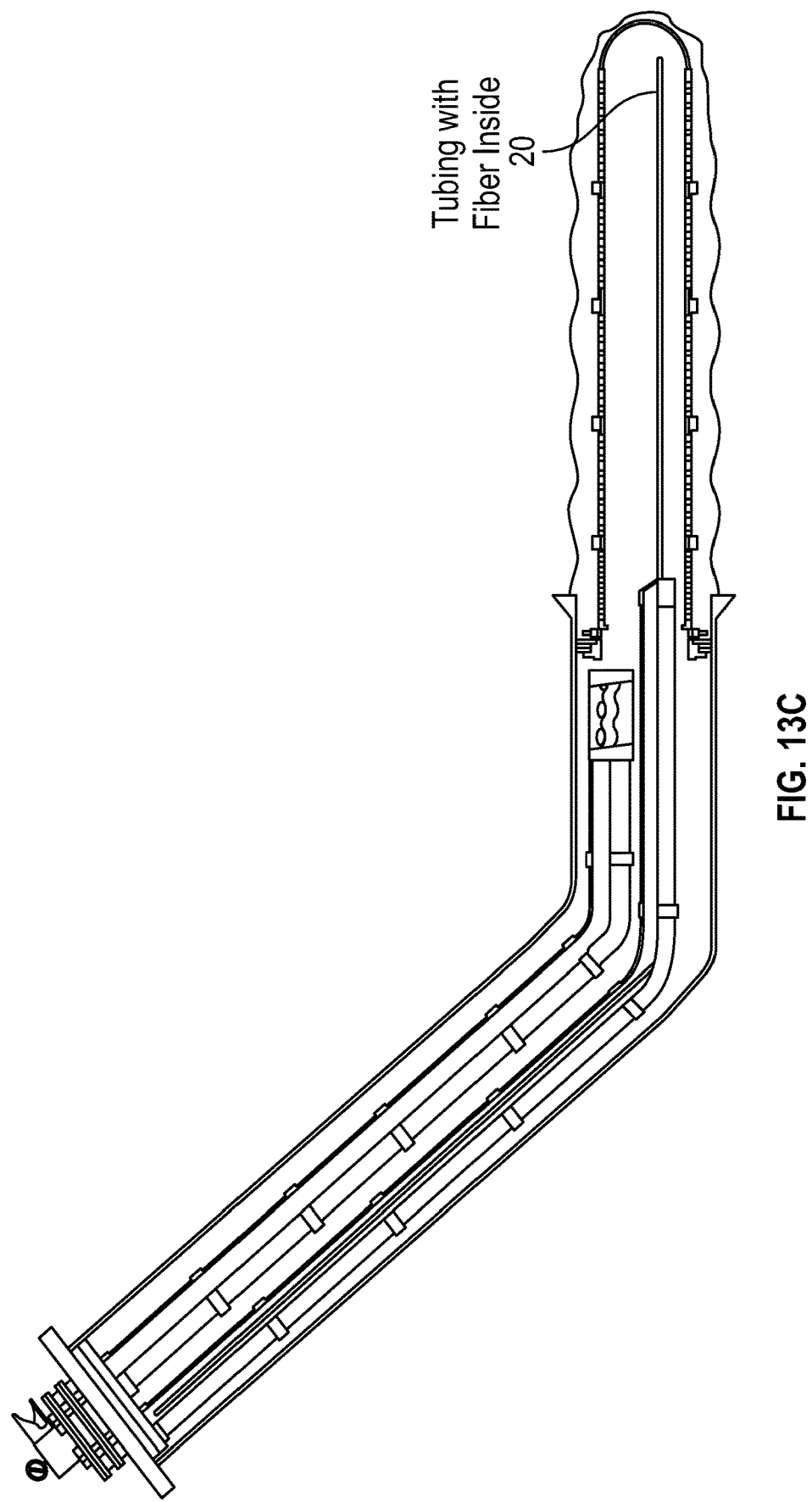
FIG. 13C illustrates an example well completion in which a control line is installed within coiled tubing.
Figure 14:
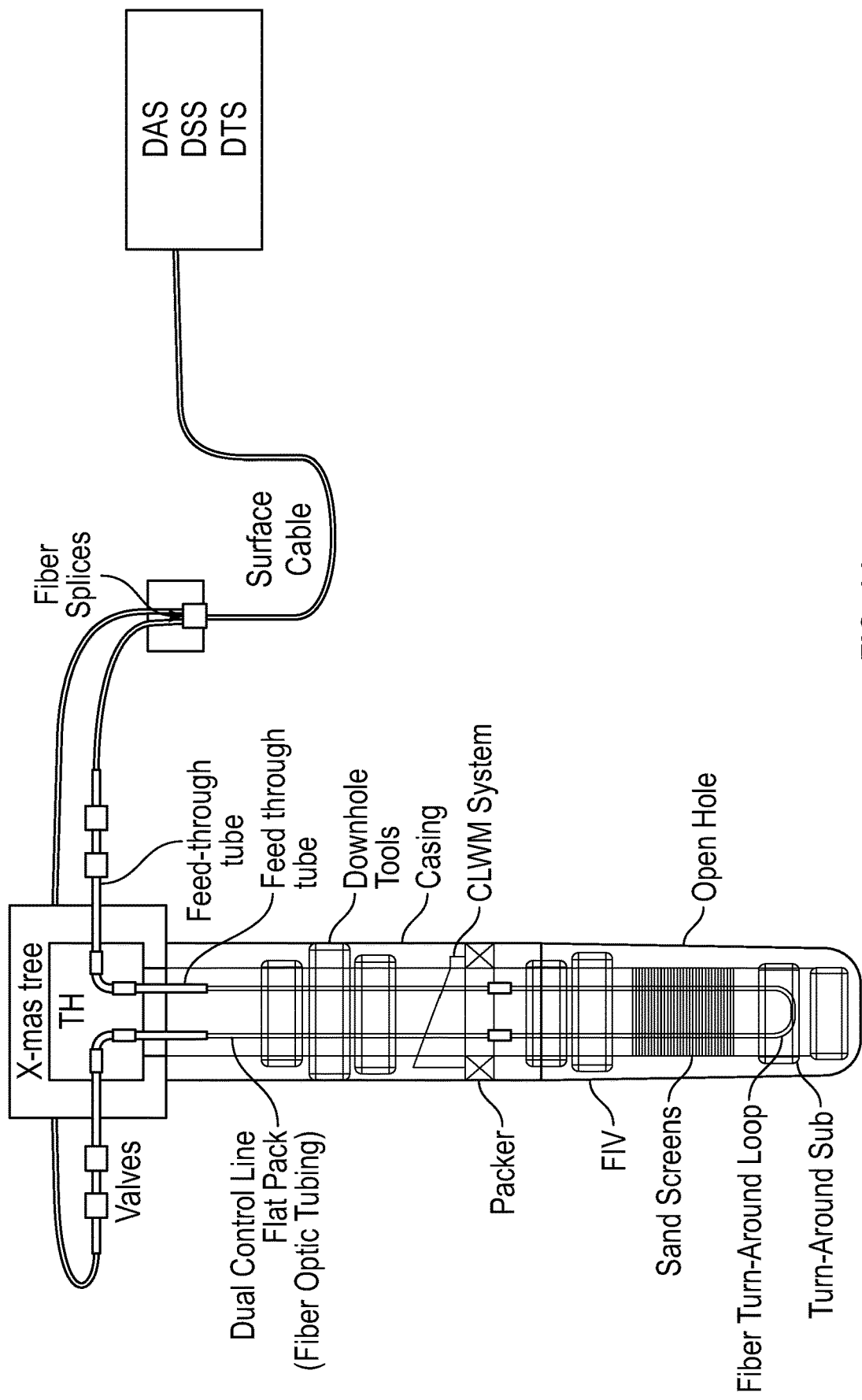
FIG. 14 illustrates an example multi-stage completion in which a control line wet mate is used to allow pumping of optical fiber into the lower completion.

Fiber can be pumped or installed in single stage and two-stage completions. In a single stage completion, the control line is continuous along the length of the well. The control line 20 can be deployed in various configurations, for example, connected to the outside of production 30 tubing as shown in FIG. 13A, connected to the outside of casing 40 and cemented in place as shown in FIG. 13B, or installed inside the production tubing. FIG. 13C shows a configuration in which the control line 20 is installed within coiled tubing. For multi-stage completions, the fiber pumping process allows the optical fiber(s) to cross to the lower completion. There is currently no fiber optic wet mate that can provide reliable downhole connection between optical cable of upper and lower completions. Therefore, without the pumping process, optical fiber would not be able to reach the lower completion. A control line wet mate (CLWM), shown in FIG. 14, allows for pumping fiber in a multistage completion. Additional details regarding the CLWM technique can be found in, for example, U.S. Pat. Nos. 7,798,212, 7,640,977, and 7,503,395, the entirety of which are hereby incorporated by reference herein. The CLWM is a self-orienting device that connects the control line tubing of the upper and lower dual-stage completions. After linking the upper and lower tubings, continuous optical fiber is pumped into position.

The pumping process can become complex if multiple fibers are required for monitoring multiple different measurands. For example, traditionally, to acquire simultaneous DAS, DSS, and DTS measurements, at least three optical fiber sensors would have to be deployed along the wellbore. The fibers would need to be pumped sequentially, and there is a high risk of the fibers becoming entangled, which could block the tubing. If tangling or blockage occurs, the fibers must be broken into small pieces and pumped out, then the process must be repeated with new fibers, which is costly and time consuming.

Figure 15:
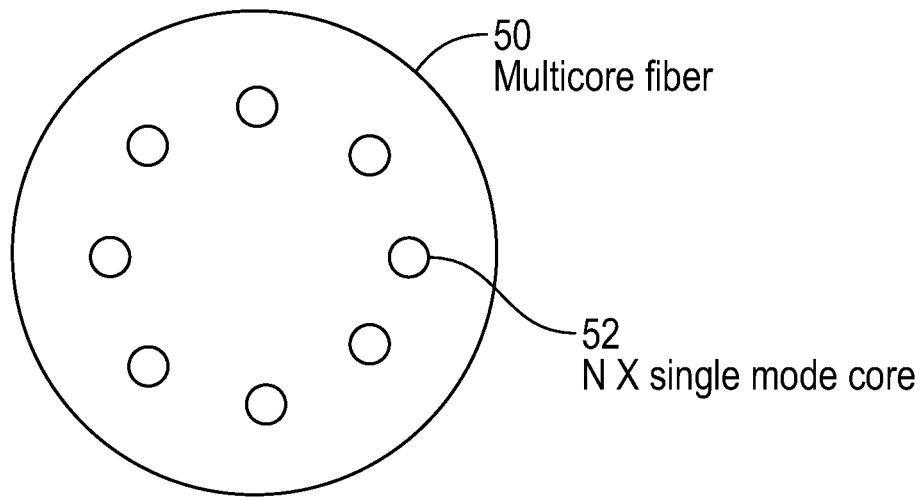
FIG. 15 illustrates a schematic cross-section of an example multicore fiber having multiple single mode cores.
Figure 16:
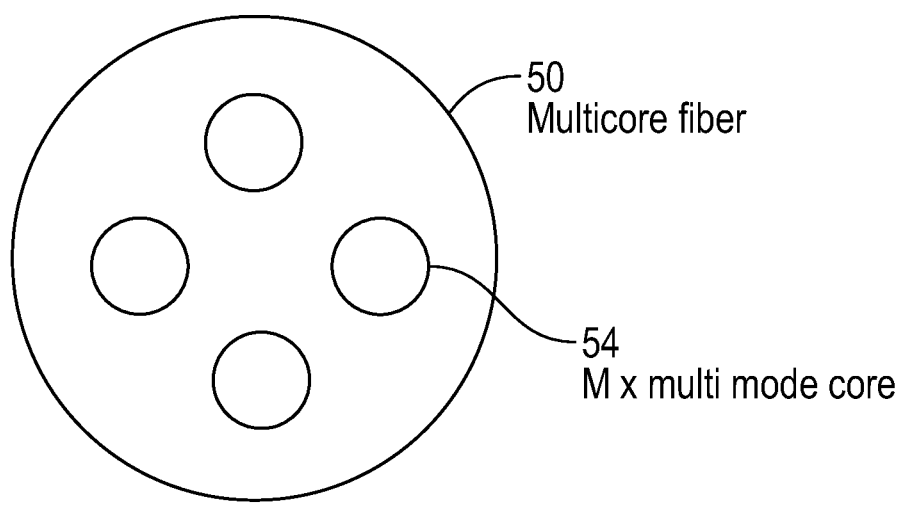
FIG. 16 illustrates a schematic cross-section of an example multicore fiber having multiple multi-mode cores.
Figure 17:
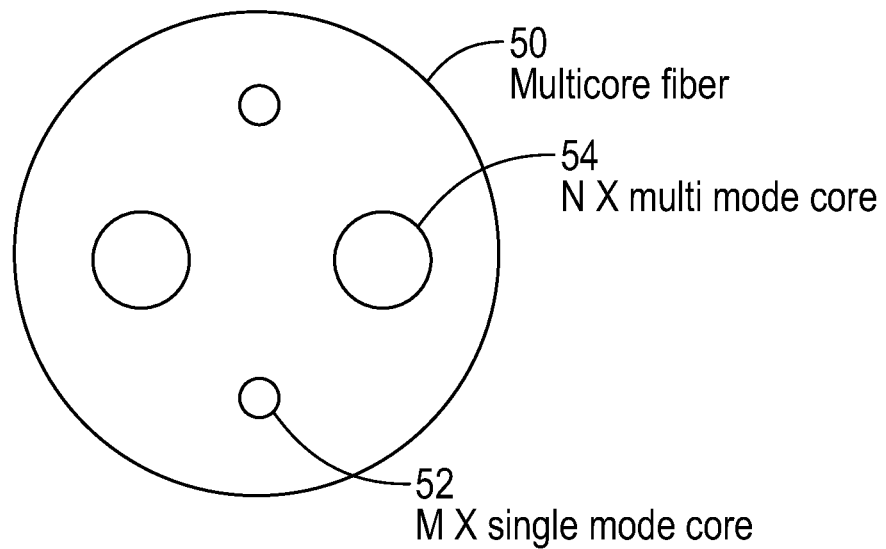
FIG. 17 illustrates a schematic cross-section of an example multicore fiber or double clad fiber having a combination of single and multi mode cores.

Therefore, some systems and methods according to the present disclosure include a multicore fiber 50. The multicore fiber 50 allows for simultaneous sensing, for example DAS, DSS, and/or DTS, in multistage completions. The multicore fiber 50 is a single fiber structure that includes more than one waveguide or core. The multicore fiber 50 can include multiple waveguides of the same or different types, such as multiple single mode cores 52 as shown in FIG. 15, multiple multi-mode cores 54 as shown in FIG. 16, or a combination of single 52 and multi mode 54 cores as shown in FIG. 17. In some configurations, single mode cores 52 can have a diameter of about 10 micron. In some configurations, multi-mode cores 54 can have a diameter of about 50 or about 62.5 micron.

Figure 1A:
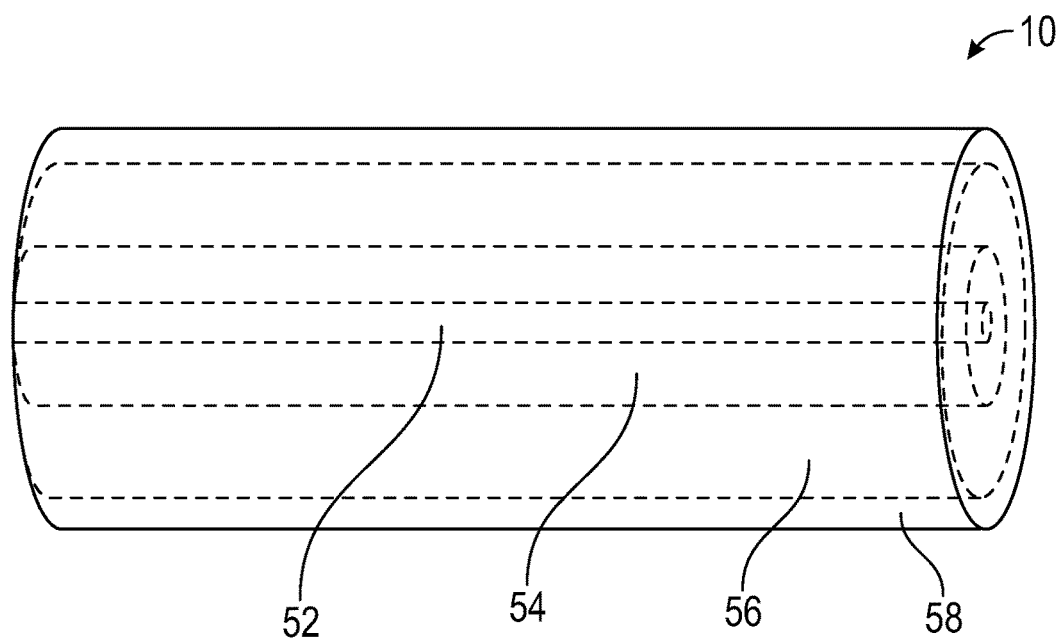
FIG. 1A is a partial perspective view of an example embodiment of a dual clad multicore fiber.
Figure 1B:
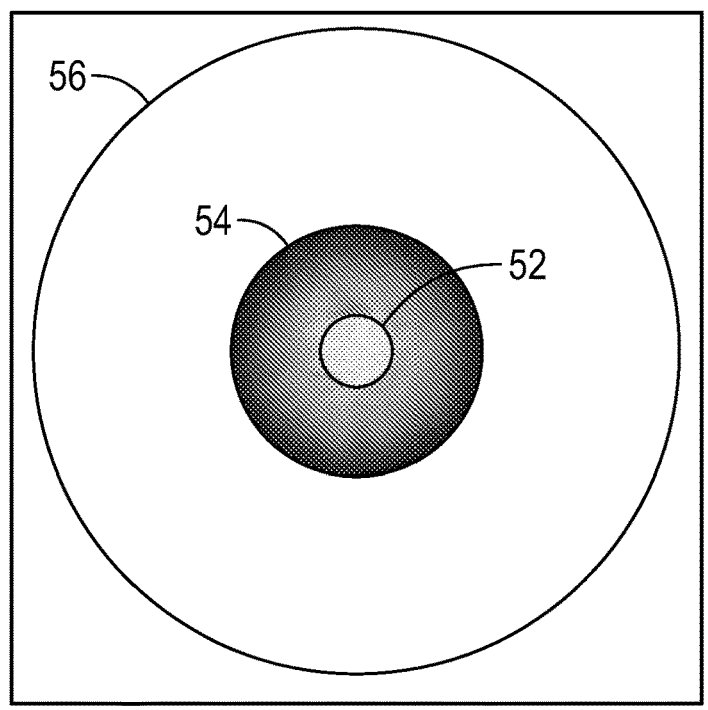
FIG. 1B shows a modal distribution of the fiber of FIG. 1A.
Figure 18:
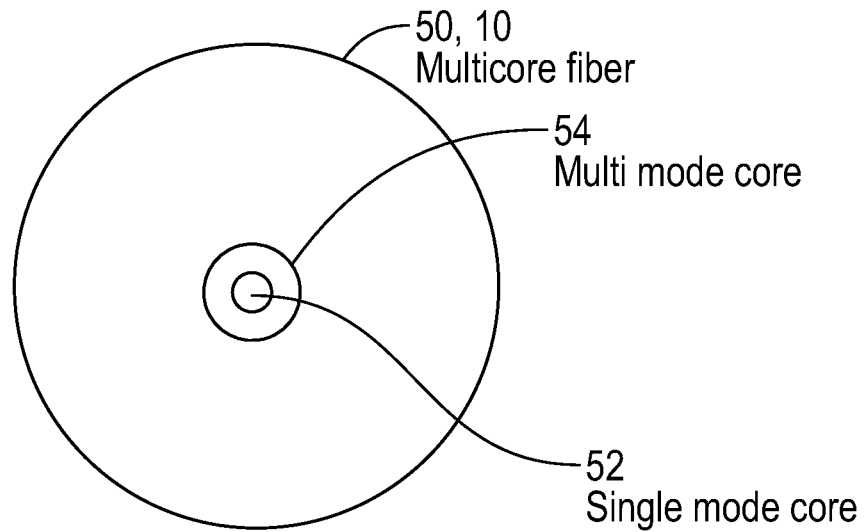
FIG. 18 illustrates a schematic cross-section of an example multicore fiber or dual clad fiber having concentric single and multi mode cores.

In some configurations, the multicore fiber 50 includes a single-mode 52 waveguide or core and a multi-mode 54 waveguide or core. In some configurations, the waveguides are arranged co-axially or concentrically, and the multicore fiber can be considered a dual clad fiber (DCF) 10, for example as shown in FIGS. 1A-1B and 18 In the illustrated configuration, the multi-mode core 54 surrounds, e.g., radially or circumferentially surrounds, the single mode core 52. As shown, the DCF 10 can also include an outer clad 56 radially or circumferentially surrounding the multi-mode core 54 and an outer coating 58 radially or circumferentially surrounding the outer clad 56. The outer coating can be acrylate or another suitable material. A dual clad fiber can advantageously have a diameter that is the same or substantially the same as a standard single-mode or multi-mode fiber, which can allow the dual clad fiber to be pumped in the oil field via typical pumping techniques and processes. Systems and methods according to the present disclosure include components that connect to and/or work with the multicore or dual clad fiber to enable simultaneous measurement of multiple measurands.

Some DAS (distributed acoustic sensing) systems, for example, the hDVS system available from Schlumberger, can operate on single-mode (SM) or multi-mode (MM) fibers. The hDVS system operates by measuring the phase of Rayleigh scattered light on a single ended (SE) optical fiber. As the system measures phase rather than amplitude, it is not critical to know the loss along the fiber. Some DTS (distributed temperature sensing) systems, for example, the DTS Ultra system available from Schlumberger, can operate on multi-mode fibers. The system operates on the basis of Raman scattering, measuring the differential between Stokes and anti-Stokes bands, with the anti-Stokes being more sensitive to temperature. Measuring the multi-mode fiber in each direction can help account for differential losses not due to temperature (e.g., bend losses, hydrogen darkening). Therefore, DTS systems can be used in single-ended and double ended configurations.

Figure 2:
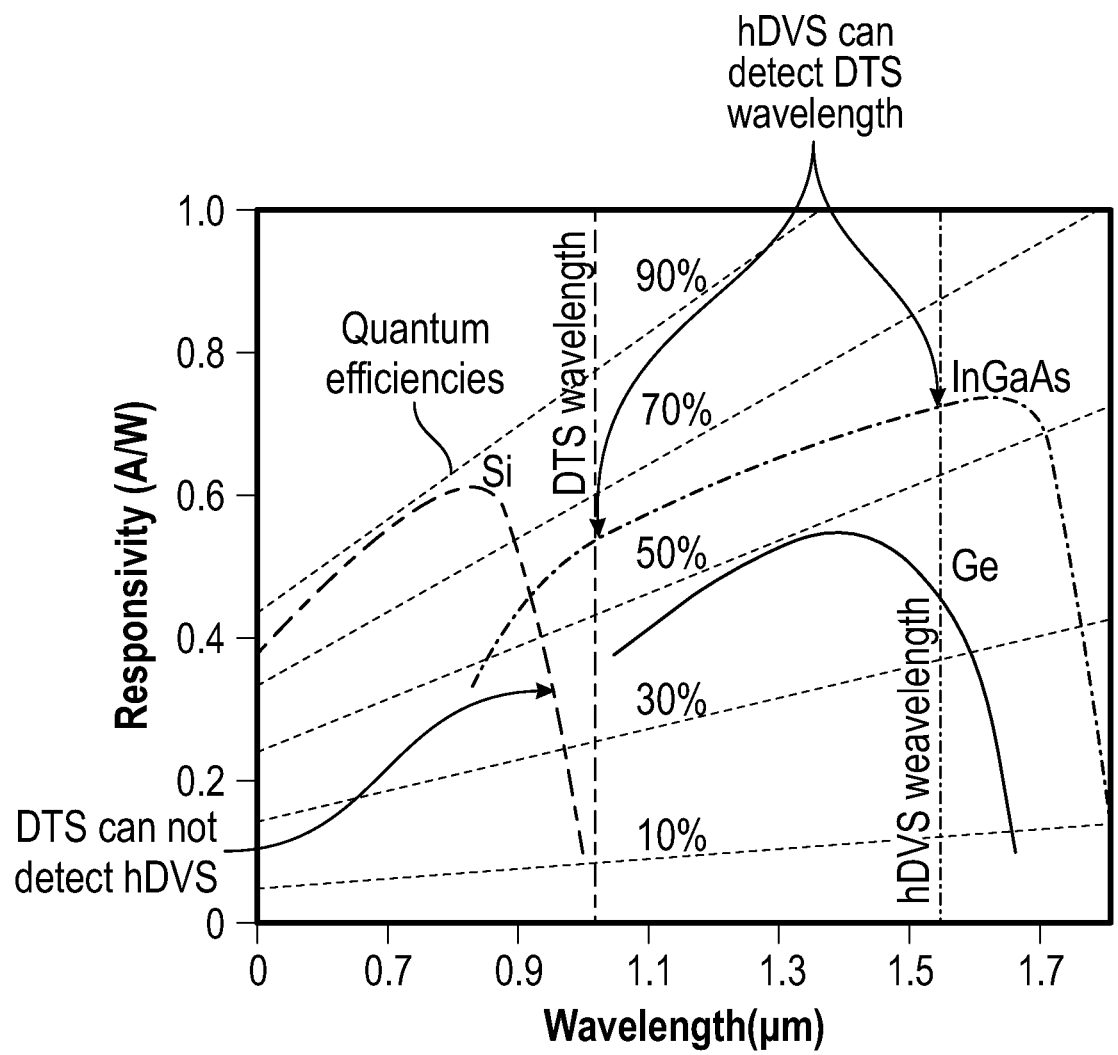
FIG. 2 graphically illustrates photodetector sensitivities to DTS and DAS produced light.

Detection technologies differ between DAS and DTS systems due to the excitation wavelengths of each system's lasers. More specifically, DTS operates at 1064 nm, while DAS operates at 1550 nm. DTS instrumentation uses a silicon based photodetector, which can detect 1064 nm while being insensitive to 1550 nm produced by DAS, as graphically shown in FIG. 2. However, DAS instrumentation uses an InGaAs detector, which can detect 1064 nm produced by DTS, as also graphically shown in FIG. 2.

Therefore, DTS light must be rejected before reaching the DAS instrumentation to prevent interference on the DAS measurements. This can be accomplished in two ways using spatial and wavelength division multiplexing. The dual clad fiber is a waveguide that can keep light channels spatially separate. The dual clad fiber can therefore be used to realize both DAS and DTS measurements. It is desirable to keep as much DAS light in the single mode part or core of the dual clad fiber as possible and as much DTS light in the inner clad region or multimode part or core of the dual clad fiber as possible.

Figure 19:
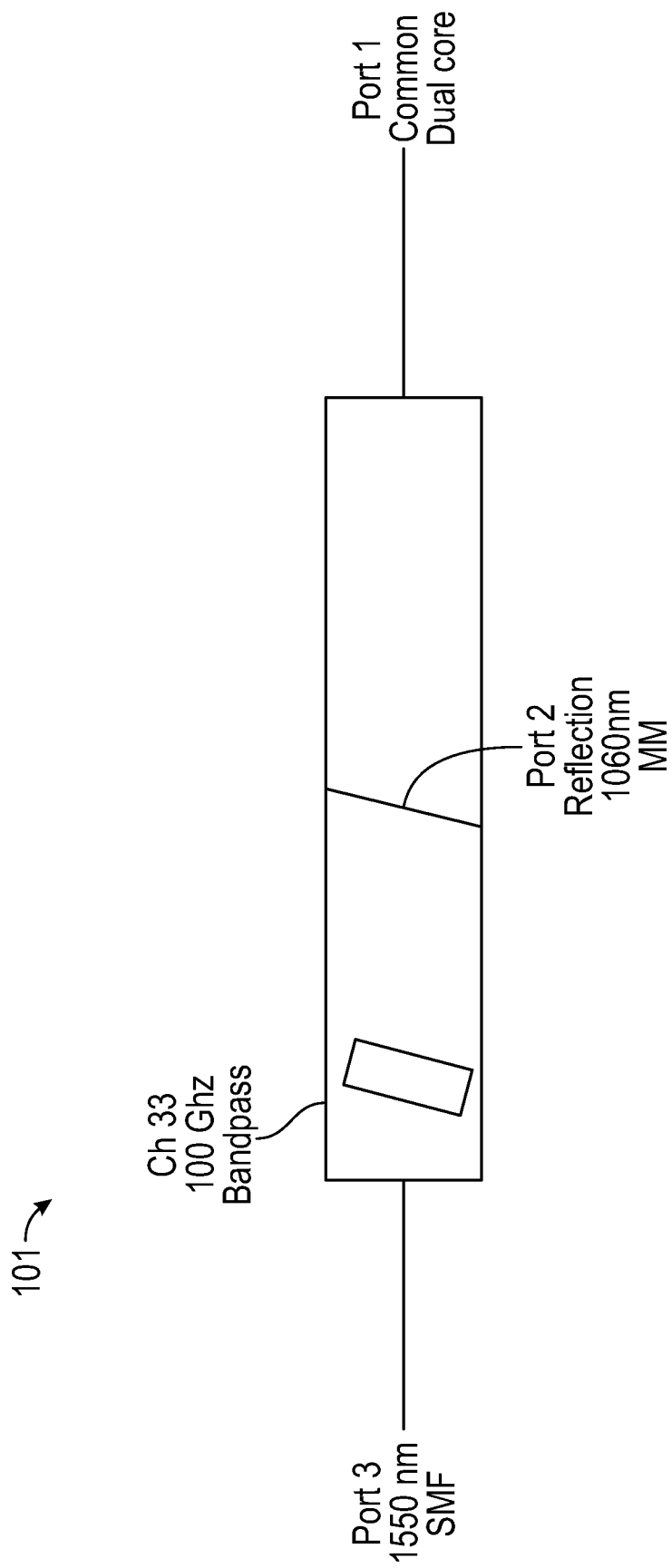
FIG. 19 illustrates an example wavelength division multiplexer.

Wavelength multiplexing can be achieved using a WDM (wavelength division multiplexer) 101. FIG. 19 illustrates the specific pass/reflect bands of the WDM 101. The WDM 101 is designed to operate such that optical signals are passed or reflected to their requisite interrogators, for example, DAS and DSS interrogators connected to port 3, DTS interrogators connected to port 2, and the DCF to be measured connected to port 1. This embodiment has no spatial multiplexing. In particular, 1064 nm will be launched into the single mode core and one must rely on the isolation of the WDM filter to prevent interference of 1064 nm on the DAS instrument.

Figure 3:
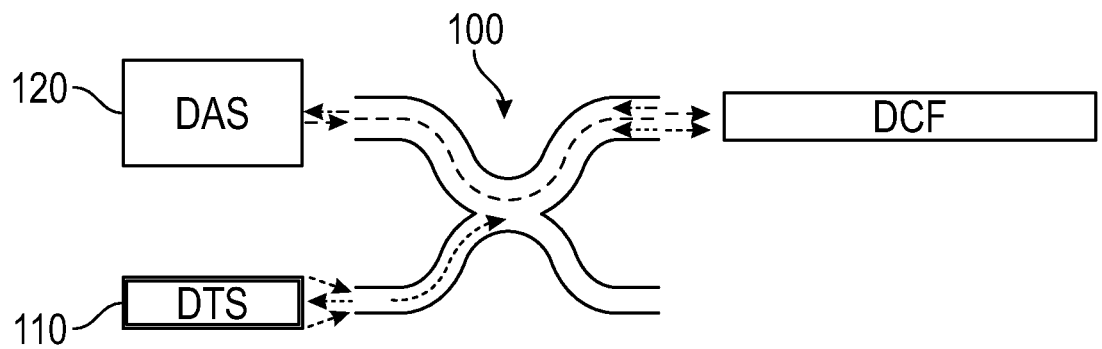
FIG. 3 schematically illustrates a Dual Clad Fiber (DCF) coupler mode of operation.

Spatial multiplexing can be achieved using a dual clad fiber coupler 100. In some configurations, the coupler 100 can be used as an alternative approach to the WDM 101 shown in FIG. 19. FIG. 3 illustrates the mode of operation of the coupler 100. The coupler 100 can be similar to a fused coupler used for splitting and/or combining optical signals. The coupler 100 is designed to operate such that the single mode path has relatively low loss between two ports, and the multimode path is split or combined. The multimode path may incur a loss of about 3 dB. Wavelength division multiplexing can be introduced or achieved by an optional thin film filter, or other wavelength filtering device, placed between the dual clad fiber coupler 100 and the DAS instrument. The thin film filter is designed to pass 1550 nm and reject 1064 nm.

As an alternative approach to the dual clad fiber coupler 100, an optical switch can be employed for time and spatial multiplexing. A custom switch, for example, using a technology such as MEMS, can be used in a 2×1 configuration. In such a configuration, Port 1 is dual clad fiber or single mode fiber, configured to be connected to the DAS. Port 2 is multi-mode fiber, configured to be connected to the DTS. The common is dual clad fiber, configured to be connected to the dual clad fiber to be deployed for measurement. This approach would require non-simultaneous measurement, and interrogation time would be divided between DAS and DTS. However, the process could be automated and allow the user to specify acquisition times depending on the application.

Figure 4:
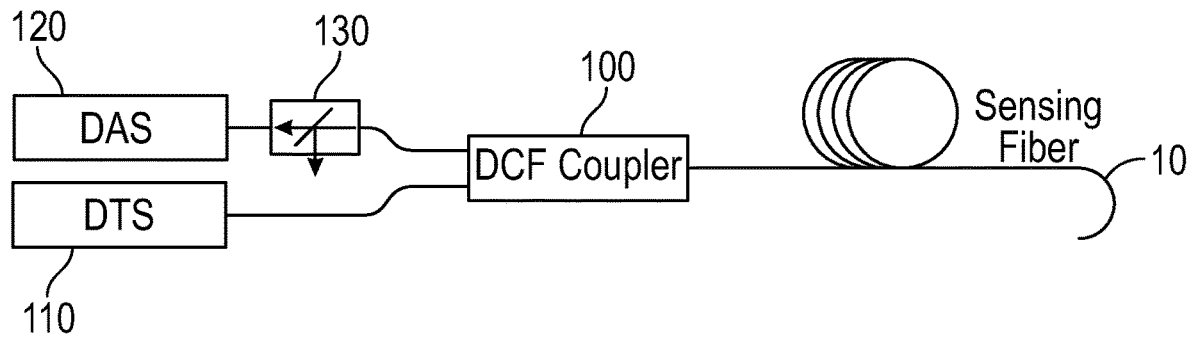
FIG. 4 schematically illustrates a DCF based distributed measurement interrogation system using a DCF coupler and a single ended configuration.

FIGS. 4-8 schematically show various example configurations for a dual clad fiber interrogation system. The system of FIG. 4 is configured for singled ended operation and simultaneous measurement. A DTS system or instrumentation 110 includes an interrogator connected to, or connected via a flying lead spliced to, the multi-mode input arm of the DCF coupler 100. A DAS system or instrumentation 120 includes an interrogator unit 120 connected to, or connected via a flying lead spliced to, the dual clad input arm of the coupler 100. The entirety or majority of light in the core of the DAS single mode patchcord or pigtail is transmitted to the single mode core of the dual core fiber 10. In some configurations, a loss-feedback method can be used to align the single mode core of the dual core fiber 10 with the DAS patchcord or pigtail core. In some configurations, a filter 130 is disposed between the DAS interrogator 120 and the coupler 100. The filter 130 allows the DAS produced light (at 1550 nm) to pass through, but rejects the DTS produced light (at 1064 nm).

The DTS and DAS source light traverse the dual clad sensing fiber 10 simultaneously. Both the DTS and DAS signals are subject to Rayleigh and Raman scattering. Light scattered backward is captured by the dual clad fiber and routed back to the interrogators 110, 120 via the coupler 100. A small quantity of DTS light may be scattered into the single mode core of the dual clad fiber 10 or coupled into the single mode core along the length of the fiber 10. This DTS light in the single mode core is rejected by the filter before reaching the DAS system.

Figure 5:
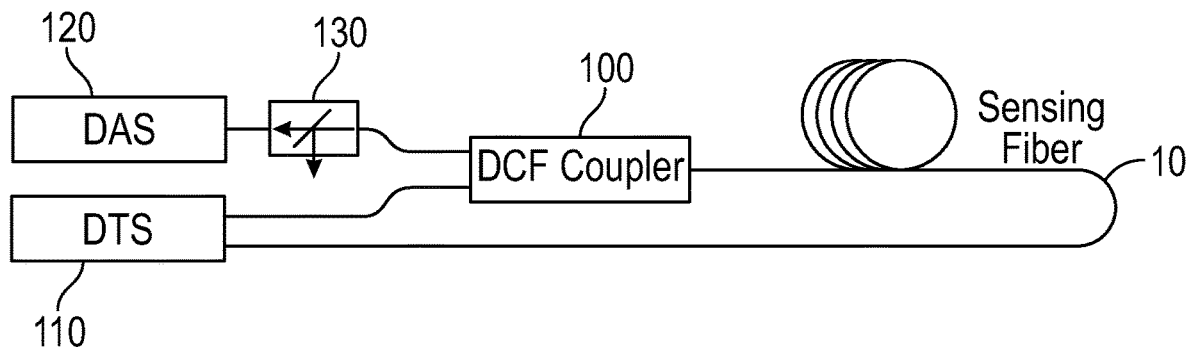
FIG. 5 schematically illustrates a DCF based distributed measurement interrogation system using a DCF coupler and a double ended configuration.

FIG. 5 schematically shows a dual clad fiber interrogation system configured for double ended operation and simultaneous measurement. As shown, only DTS operates in the double ended configuration. The double ended configuration for the DTS allows for greater loss correction, which allows for improved temperature accuracy, for example, compared to a single ended system. The system components of the system of FIG. 5 are generally the same as the system of FIG. 4, except in the double ended system of FIG. 5 the dual clad sensing fiber 10 is routed back to a paired port on the DTS system 110. In this configuration, DTS light can be routed on the single mode core and multi-mode inner clad parts of the dual clad fiber 10. The coupler 100 is only modally selective, and not wavelength selective, so effective filtering and rejection of DTS produced light is required before impinging on the DAS system to prevent or inhibit interference when the DTS source is firing.

Figure 6:
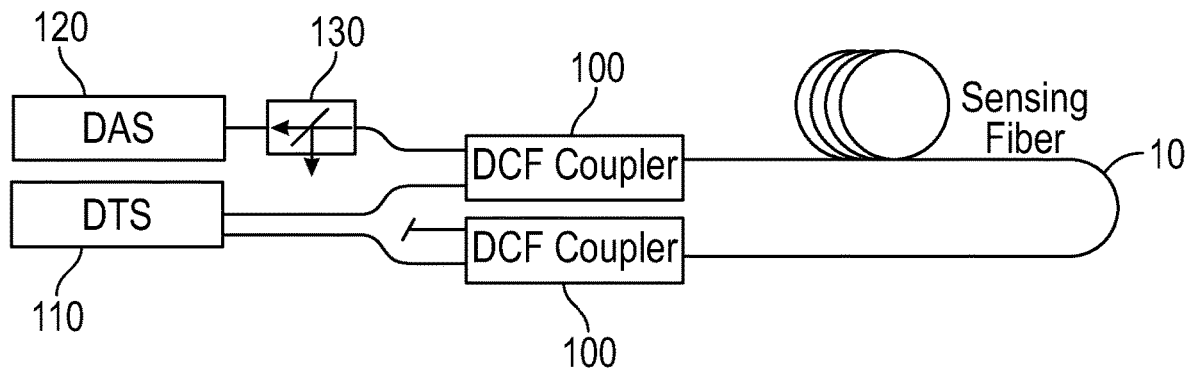
FIG. 6 schematically illustrates a DCF based distributed measurement interrogation system using a double ended configuration and two DCF couplers for improved DTS/DAS isolation.

The dual clad fiber interrogation system of FIG. 6 reduces the launch of DTS light into the single mode core of the dual clad fiber 10 via the use of two couplers 100.

Figure 7:
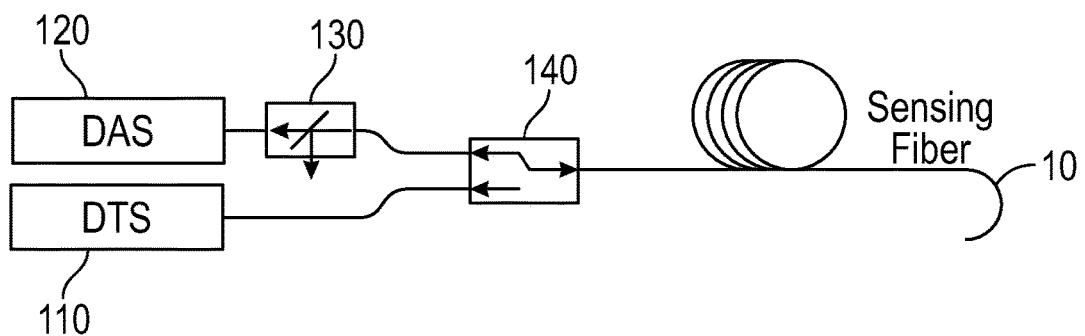
FIG. 7 schematically illustrates a DCF based distributed measurement interrogation system using a DCF switch and a single ended configuration.

FIG. 7 schematically illustrates a dual clad fiber interrogation system including an optical switch 140 instead of the coupler 100. As shown, the switch 140 has a 2×1 port configuration. In the illustrated configuration, the switch 140 has the single mode of the dual clad fiber on or connected to the DAS input, a multi-mode fiber on or connected to the DTS input, and the dual clad fiber 10 on or connected to the common output. In other words, the single mode of the dual clad fiber can couple the DAS instrumentation and/or interrogator 120 to one of the switch 140 inputs, the multi-mode fiber can couple the DTS instrumentation and/or interrogator 110 to the other switch 140 input, and the dual clad sensing fiber 10 can be coupled to the switch 140 output. In this configuration, DAS and DTS cannot be measured simultaneously, but in use, instrumentation, for example, a controller, controlling the switch 140 can cycle between the two input ports. The duty cycle and length of measurement time can be set by control software. FIG. 7 illustrates a single-ended configuration; however, the optical switch 140 could be used in a double-ended configuration, for example similar to that shown in FIG. 5 with the switch 140 in place of the coupler 100.

Figure 8:
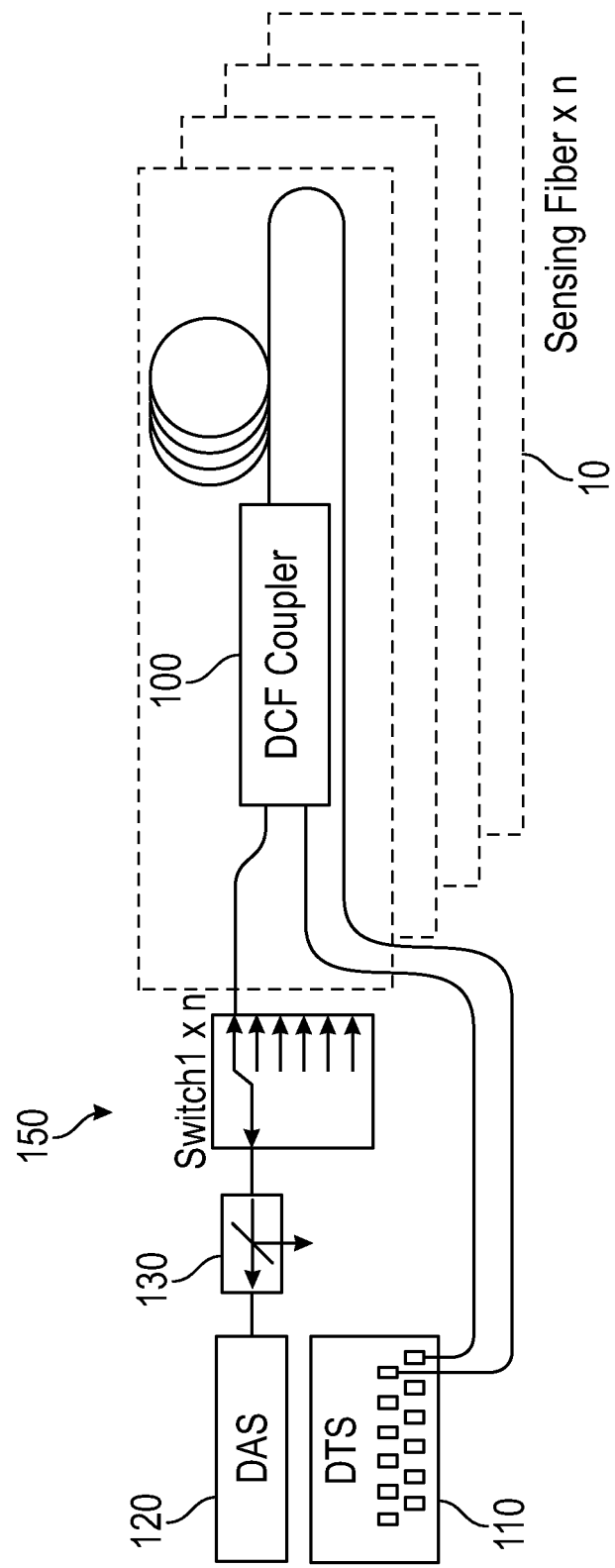
FIG. 8 schematically illustrates a multichannel DCF based distributed measurement interrogation system.

The existing multichannel functionality of the DTS interrogator 110 can be used in an application in which multiple sensing fibers 10 are to be used and interrogated. The DAS interrogator 120 can be expanded or multiplexed with a 1×n switch 150, for example as shown in FIG. 8. Measurements can be time multiplexed over the number of fibers 10 used or interrogated. A coupler 100 (as shown in FIG. 8) or switch 140 is used to couple each dual clad sensing fiber 10 in the system to the DAS 120 and DTS 110 interrogators. Therefore, a system with n fibers 10 includes n couplers 100 and/or switches 140.

Figure 9:
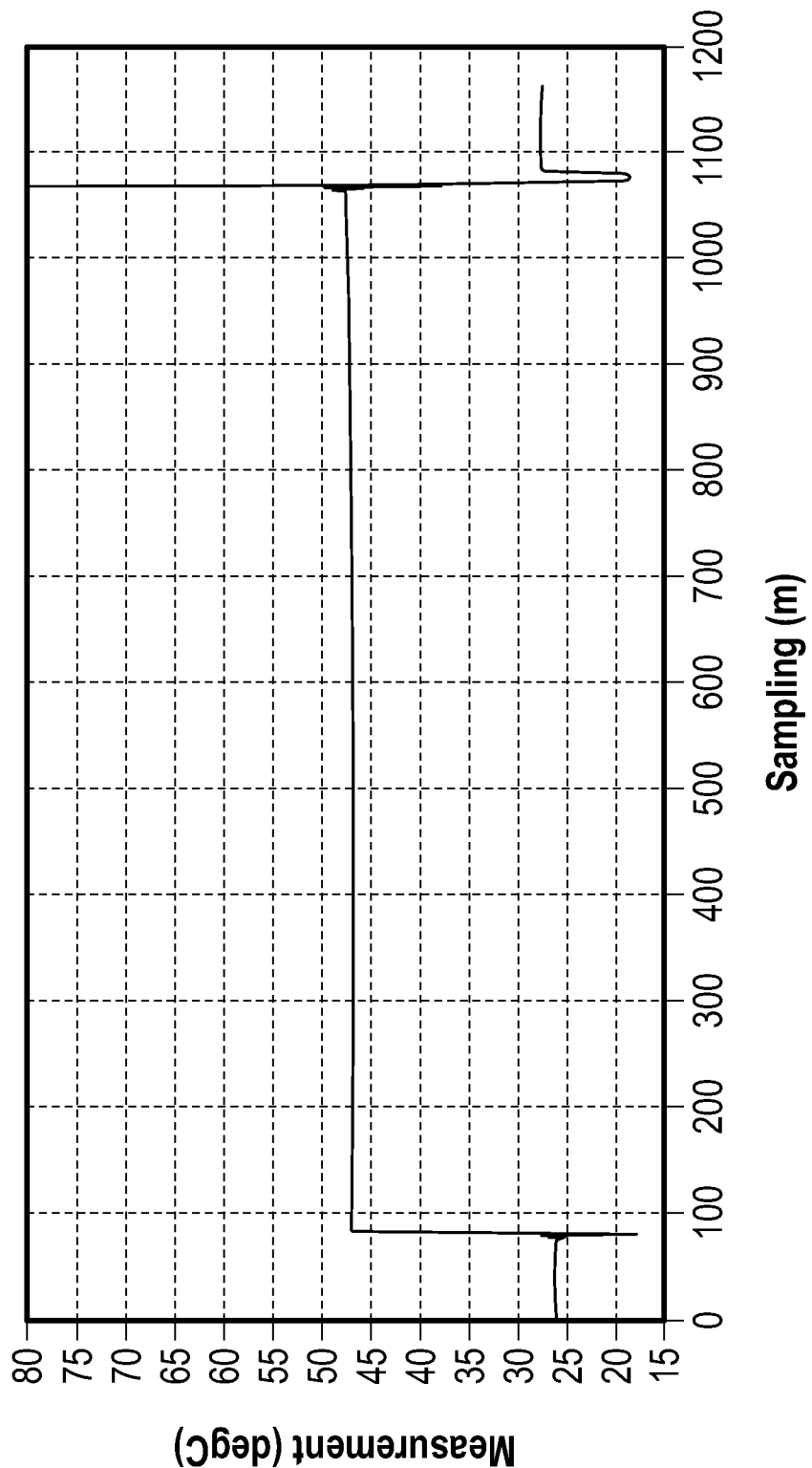
FIG. 9 graphically illustrates DTS data measured on a length of DCF.
Figure 10:
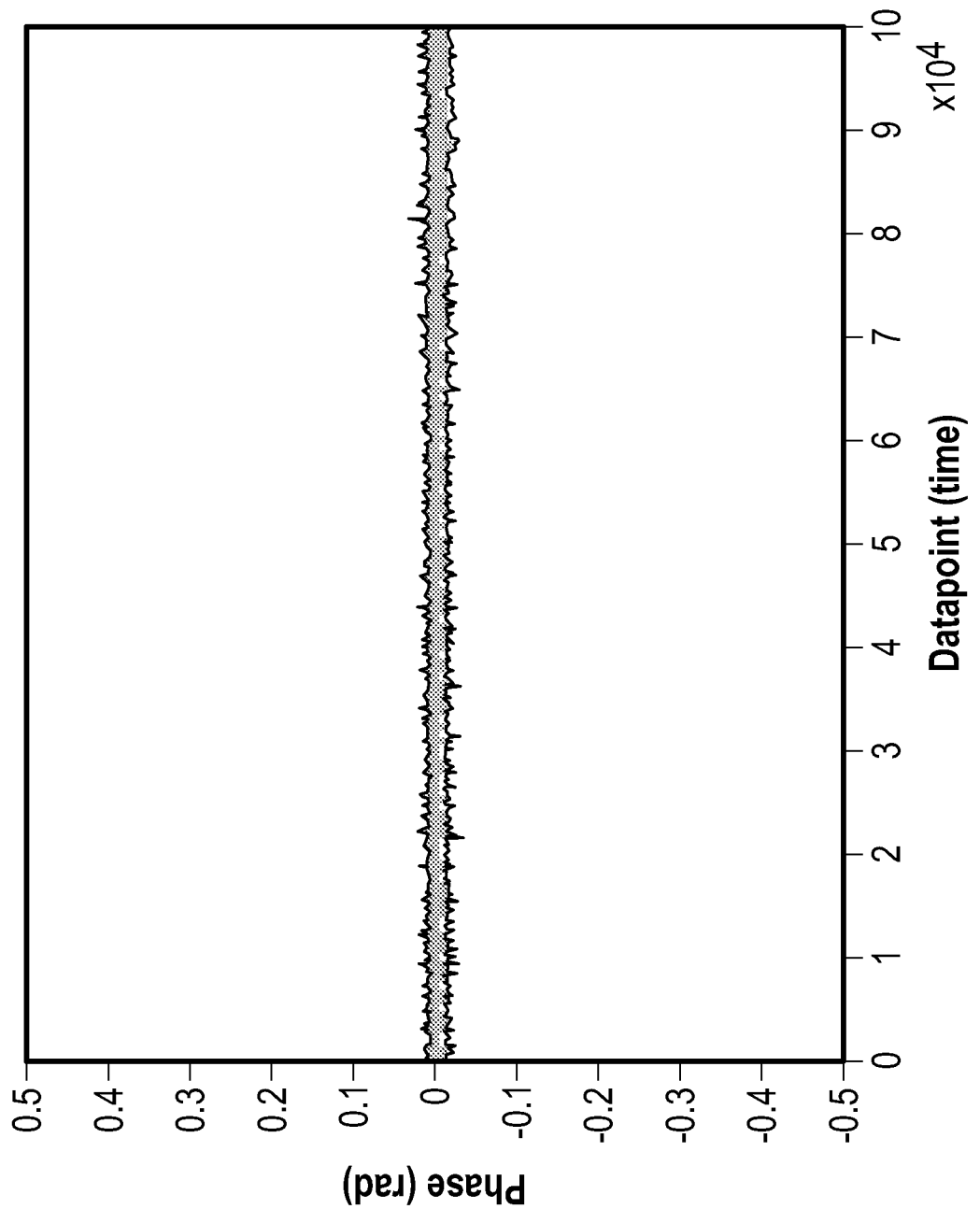
FIG. 10 graphically illustrates a DAS measurement of background noise.
Figure 11:
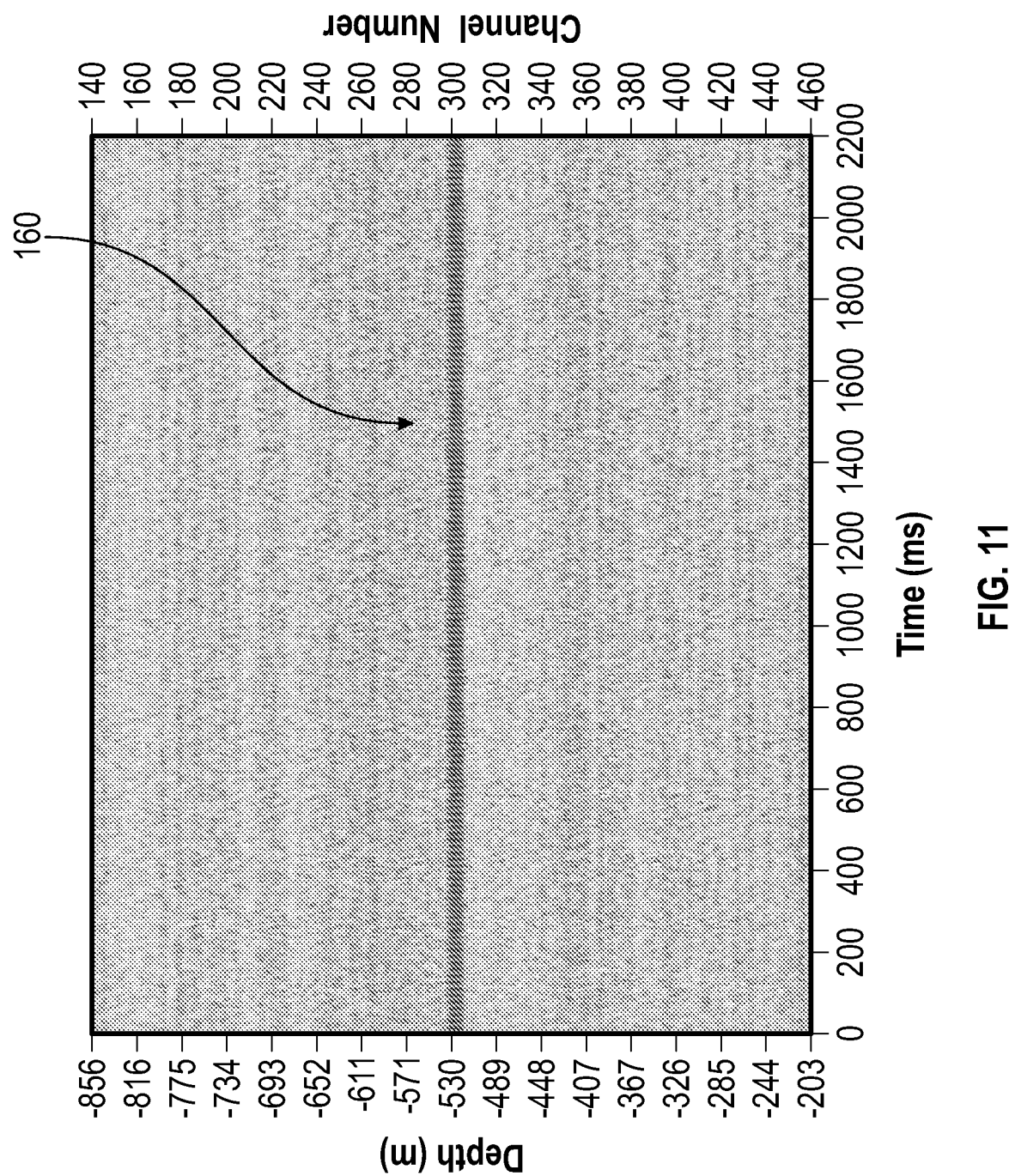
FIG. 11 graphically illustrates a "SEG-Y" plot of DAS data recorded on DCF.

FIGS. 9-11 illustrate data obtained from dual clad fiber interrogation systems as shown in FIGS. 4 and 5. FIG. 9 shows data recorded with a DTS system 110 including a 1000 m length of dual clad fiber 10 within a temperature chamber. The length of fiber 10 within the temperature chamber is approximately the middle 1000 m indicated on the graph. The coupler 100 is located at about 80 m and about 1080 m. The excursions, due to reflections, shown on the graph are therefore at the ends of the length within the chamber and localized. FIG. 10 shows DAS "self-noise" for 100 neighboring locations on the dual clad fiber 10 in an isolation chamber. FIG. 11 shows the response from the dual clad fiber 10 in a "SEG-Y" style plot. The data received is phase vs. distance along the fiber 10 and time. The band 160 at −530 m corresponds to the response of a PZT-based fiber-stretcher, utilizing the dual clad fiber 10, being modulated by a 63 Hz sinusoidal signal.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A fiber optic sensing system for use in a wellbore, the system comprising:

Distributed Acoustic Sensing (DAS) instrumentation comprising an interrogator;

Distributed Temperature Sensing (DTS) instrumentation comprising an interrogator;

a first coupler comprising a first input and a second input, the DAS instrumentation coupled to the first input, and the DTS instrumentation coupled to the second input;

a filter disposed between the DAS instrumentation and the first coupler, the filter configured to allow DAS produced light to pass through but reject DTS produced light; and a multicore optical fiber coupled to the first coupler, wherein the first coupler is disposed between the DAS instrumentation and the multicore optical fiber, and wherein the first coupler is disposed between the DTS instrumentation and the multicore optical fiber.

2. The system of claim 1, wherein the filter is a thin film filter.

3. The system of claim 1, wherein the multicore optical fiber comprises a multi-mode core waveguide concentrically or radially surrounding a single mode core waveguide.

4. The system of claim 1, wherein a first end of the multicore optical fiber is coupled to the first coupler, and a second end of the multicore optical fiber is coupled to the DTS instrumentation.

5. The system of claim 1, further comprising a second coupler, wherein the DTS instrumentation is coupled to the second coupler, and wherein a first end of the multicore optical fiber is coupled to the first coupler and a second end of the optical fiber is coupled to the second coupler.

6. The system of claim 1 further comprising at least one additional multicore optical fiber and at least one additional coupler.

7. A method of deploying a multicore optical fiber in a wellbore, the method comprising:

deploying a control line in the wellbore, the control line comprising a metal tube; and pumping the multicore optical fiber into the control line coupling the multicore optical fiber to an outlet of a coupler, wherein:
  a first inlet of the coupler is coupled to Distributed Temperature Sensing (DTS) instrumentation; and
  a second inlet of the coupler is coupled to a filter which is coupled to Distributed Acoustic Sensing (DAS) instrumentation.

8. The method of claim 7, wherein the multicore optical fiber comprises a multi-mode core waveguide concentrically or radially surrounding a single mode core waveguide.

9. The method of claim 7, wherein pumping the multicore optical fiber comprises using water, Toluene, Xylene, and/or IPA as a carrier medium.

10. The method of claim 7, wherein the wellbore is completed with a multi-stage completion having an upper completion and a lower completion, and pumping the multicore optical fiber allows the multicore optical fiber to reach the lower completion.

11. The method of claim 10, wherein deploying the control line comprises using a CLWM to couple a first portion of the control line in the upper completion with a second portion of the control line in the lower completion.

12. The method of claim 11, wherein pumping the multicore optical fiber comprises deploying continuous optical fiber through the first and second portions of the control line to reach the lower completion.

13. The method of claim 7, wherein deploying the control line comprises coupling the control line to an outside of production tubing deployed in the wellbore.

14. The method of claim 7, wherein deploying the control line comprises disposing the control line outside of a casing of the wellbore and cementing the control line in place.

15. The method of claim 7, wherein deploying the control line comprises disposing the control line within coiled tubing.

* * * * *